(12) United States Patent
Kuwayama et al.

(10) Patent No.: US 10,919,380 B2
(45) Date of Patent: Feb. 16, 2021

(54) FUEL SHUT-OFF VALVE

(71) Applicant: TOYODA GOSEI CO., LTD., Kiyosu (JP)

(72) Inventors: Kenta Kuwayama, Troy, MI (US); Caleb Bauer, Troy, MI (US); Steven Yurgalonis, Troy, MI (US)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 4 days.

(21) Appl. No.: 16/261,824

(22) Filed: Jan. 30, 2019

(65) Prior Publication Data

US 2020/0238821 A1 Jul. 30, 2020

(51) Int. Cl.
*B60K 15/03* (2006.01)
*F02M 37/00* (2006.01)
*F16K 24/04* (2006.01)
*B60K 15/035* (2006.01)
*F16K 31/18* (2006.01)
*B60K 15/04* (2006.01)

(52) U.S. Cl.
CPC ..... *B60K 15/03519* (2013.01); *F02M 37/007* (2013.01); *F02M 37/0082* (2013.01); *F16K 31/18* (2013.01); *B60K 15/04* (2013.01); *B60K 2015/03289* (2013.01); *B60K 2015/03566* (2013.01)

(58) Field of Classification Search
CPC ...... F02M 37/0082; B60K 2015/03289; B60K 2015/03566; F16K 24/044
USPC ....................................................... 137/202
See application file for complete search history.

(56) References Cited

U.S. PATENT DOCUMENTS

| 4,927,191 A | * | 5/1990 | Mikol | F16L 11/111 138/121 |
| 2002/0121301 A1 | * | 9/2002 | Devall | B60K 15/03519 137/202 |
| 2007/0000542 A1 | | 1/2007 | Johansen | |
| 2014/0209190 A1 | | 7/2014 | Nakaya et al. | |

FOREIGN PATENT DOCUMENTS

| JP | 2002-285929 A | 10/2002 |
| JP | 2007-009906 A | 1/2007 |
| JP | 2008-128189 A | 6/2008 |
| JP | 2011-201490 A | 10/2011 |
| JP | 2014-144742 A | 8/2014 |

* cited by examiner

*Primary Examiner* — Marina A Tietjen
*Assistant Examiner* — Paul J Gray
(74) *Attorney, Agent, or Firm* — Posz Law Group, PLC (57) ABSTRACT

A fuel shut-off valve includes a housing, a float valve, and a tubular fuel inflow portion. The housing includes a communicating opening that communicates with the outside of the fuel tank, a tubular portion that extends in a vertical direction, and an inlet for liquid fuel located in the tubular portion at a position below the communicating opening. The float valve selectively closes and opens the communicating opening by moving vertically. The fuel inflow portion is provided outside the tubular portion and has a first end having an inflow port for liquid fuel and a second end connected to the inlet. The inflow port is opened at a position that is above the inlet and spaced outward in a radial direction from the tubular portion. The housing includes a discharge port for discharging liquid fuel in the housing.

10 Claims, 9 Drawing Sheets

FUEL SHUT-OFF VALVE

BACKGROUND

The present disclosure relates to a fuel shut-off valve that shuts off the flow of fuel vapor to the outside of a fuel tank when the fuel shut-off valve detects that the fuel tank is filled up with liquid fuel.

The fuel tank in a vehicle is equipped with a fuel shut-off valve that closes the communicating opening when detecting that the fuel tank is filled up, thereby shutting off the flow of fuel vapor to the outside of the fuel tank.

Figure 14:
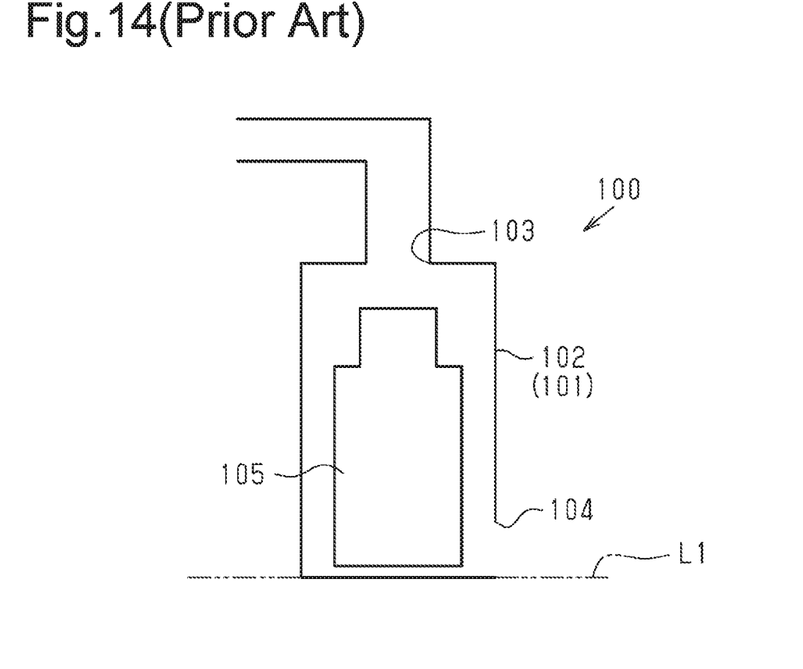
FIG. 14 is a schematic cross-sectional view of a conventional fuel shut-off valve.

For example, the fuel shut-off valve described in Japanese Laid-Open Patent Publication No. 2014-144742 includes a housing 101 and a float valve 105, as shown in FIG. 14. The housing 101 includes a tubular portion 102 extending in the vertical direction. The housing 101 has at the top a communicating opening 103 leading to the outside of the fuel tank. The housing 101 has a liquid fuel inlet 104 inside the fuel tank at a position below the communicating opening 103 of the tubular portion 102. The float valve 105 is housed in the tubular portion 102 so as to be movable vertically.

In the fuel shut-off valve 100 having the above-described configuration, when the level of the liquid fuel is raised to a full-tank level L1 during refueling, the liquid fuel flows into the tubular portion 102 through the inlet 104. As the level of the liquid fuel rises, the float valve 105 rises due to the float valve 105 being buoyant on the liquid fuel. When the float valve 105 closes the communicating opening 103, the flow of fuel vapor to the outside of the fuel tank is shut off. In the fuel shut-off valve 110, the inlet 104 detects the full-tank level L1 of liquid fuel.

Incidentally, in recent years, there has been a demand to raise the full-tank level L1. In order to meet this demand, it is conceivable to form the inlet 104 at a high position in the tubular portion 102. However, although this measure meets the above demand, the inlet 104 will approach the communicating opening 103. Therefore, when sloshing of liquid fuel causes the surface of the liquid fuel to rise and fall, there is a problem in that the liquid fuel flowing in from the inlet 104 may flow into the communicating opening 103 and flow out to the outside of the fuel tank.

Figure 15A:
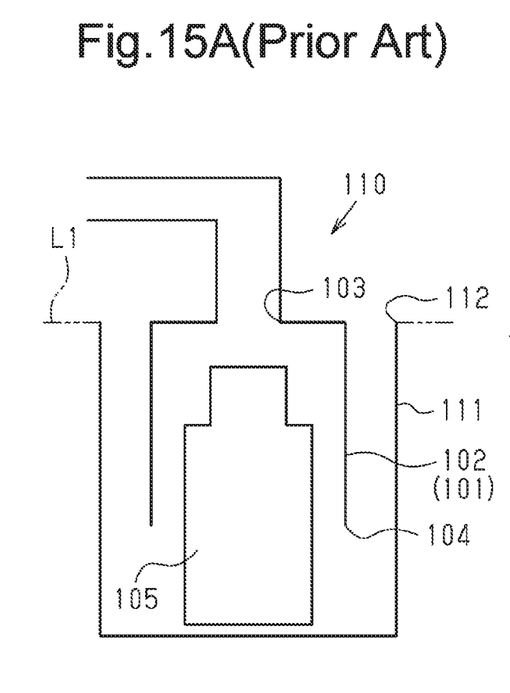
FIG. 15A is a schematic cross-sectional view of a conventional fuel shut-off valve of a type different from that of FIG. 14.

In this respect, Japanese Laid-Open Patent Publication No. 2007-9906 discloses a fuel shut-off valve 110 that includes a liquid fuel inflow port 112 in addition to the inlet 104, as shown in FIG. 15A. In FIG. 15A, the same reference numerals are assigned to elements common to FIG. 14. In this fuel shut-off valve 110, a fuel inflow portion 111 is provided around and adjacent to the housing 101, so that the inlet 104 is surrounded by the fuel inflow portion 111. The upper end of the fuel inflow portion 111 is located above the inlet 104 and at the same height as the full-tank level L1. The upper end of the fuel inflow portion 111 is opened upward and forms the inflow port 112 for liquid fuel. In the fuel shut-off valve 110, in place of the inlet 104, the inflow port 112 detects the full-tank level L1 of liquid fuel.

With the fuel shut-off valve 110, when the level of liquid fuel rises to the full-tank level L1 of liquid fuel during refueling, the liquid fuel flows into the fuel inflow portion 111 from the inflow port 112. The liquid fuel is guided to the inlet 104 by the fuel inflow portion 111 and flows into the housing 101 through the inlet 104. Therefore, it is possible to meet the demand for an increase in the full-tank level L1.

However, the above-described fuel shut-off valve 110 has a problem of limited flexibility in the installing position with respect to the fuel tank.

This is because, in part, since the inflow port 112 is adjacent to the housing 101, the position of the housing 101 is largely restricted by the inflow port 112.

For example, when the vehicle is tilted, refueling may be performed with the fuel tank inclined accordingly. The distance between the ceiling wall of the fuel tank and the surface of the liquid fuel when the fuel tank is not tilted may be referred to as a distance D1. Also, the distance between the ceiling wall and the surface of the liquid fuel when the fuel tank is tilted may be referred to as a distance D2. The difference ΔD between the two distances D1 and D2 is the smallest at the central portion of the fuel tank in a plan view, and increases as the distance from the central portion increases.

Therefore, the detection accuracy decreases as the distance between the inflow port 112, which detects a full tank, and the central portion increases, and the detection accuracy increases as the distance decreases.

Therefore, the fuel shut-off valve 110 may be arranged such that the inflow port 112 is positioned in the central portion.

However, in the fuel shut-off valve 110, since the inflow port 112 is adjacent to the housing 101 as described above, the housing 101 is limited to arrangement in the central portion of the fuel tank. This limits the flexibility in the installing position.

Figure 15B:
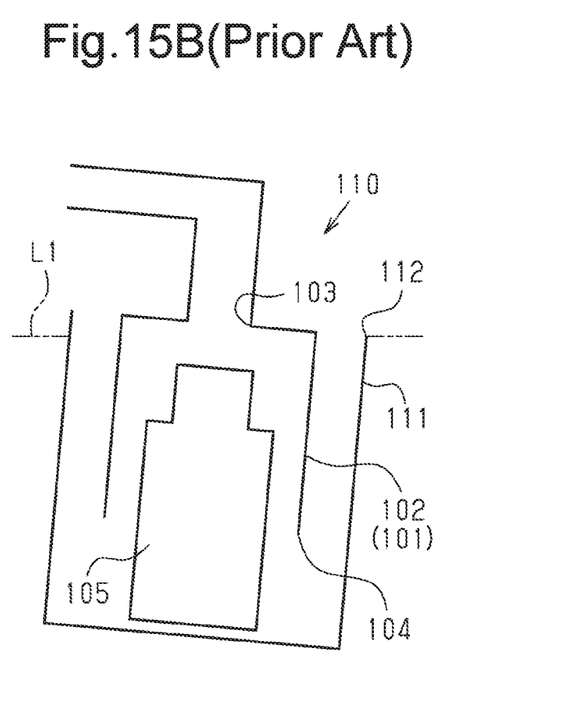
FIG. 15B is a schematic cross-sectional view illustrating operation of the fuel shut-off valve of FIG. 15A when tilted.

Also, the fact that the inflow port 112 is provided around the entire circumference of the housing 101 reduces the flexibility in the installing position. That is, when the fuel tank is tilted, the inflow port 112 of the fuel shut-off valve 110 is also tilted as shown in FIG. 15B. As described above, the inflow port 112 detects the full-tank level L1 of liquid fuel. Thus, when the fuel tank is tilted, the inflow port 112 detects the level L1 at the lowest point of the inflow port 112, which is tilted in accordance with the inclination of the fuel tank. Regardless of the direction in which the fuel tank is tilted, the inflow port 112 detects the level L1 at the lowest point of the inflow port 112. In other words, the full-tank level L1 is uniquely determined to be the lowest point in the inflow port 112. Therefore, it is difficult to meet the demand for an increase in the full-tank level L1. This also limits the flexibility in the installing position of the fuel shut-off valve 110.

SUMMARY

It is an objective of the present invention to provide a fuel shut-off valve capable of increasing the flexibility in the installing position in a fuel tank.

In one general aspect, a fuel shut-off valve configured to shut off a flow of fuel vapor to an outside of a fuel tank is provided. The fuel shut-off valve includes a housing, a float valve, and a tubular fuel inflow portion. The housing includes a communicating opening provided in an upper part of the housing and communicates with the outside of the fuel tank, a tubular portion extending in a vertical direction, and an inlet for liquid fuel provided inside the fuel tank. The inlet is located in the tubular portion at a position below the communicating opening. The float valve is housed in the tubular portion and configured to move vertically. The float valve selectively closes and opens the communicating opening by the vertical movement. The fuel shut-off valve is configured such that, as a level of liquid fuel that has flowed into the tubular portion through the inlet rises, the float valve moves upward and closes the communicating opening to shut off the flow of fuel vapor to the outside of the fuel tank. The tubular fuel inflow portion is provided outside the tubular portion and has a first end having an inflow port for liquid fuel and a second end connected to the inlet. The fuel inflow portion guides liquid fuel that has flowed in from the inflow port to the inlet. The inflow port is opened at a position that is above the inlet and spaced outward in a radial direction from the tubular portion. The housing includes a discharge port configured to discharge liquid fuel in the housing.

Other features and aspects will be apparent from the following detailed description, the drawings, and the claims.

DETAILED DESCRIPTION

First Embodiment

A fuel shut-off valve 20 according to a first embodiment will now be described with reference to FIGS. 1 to 3.

Figure 1:
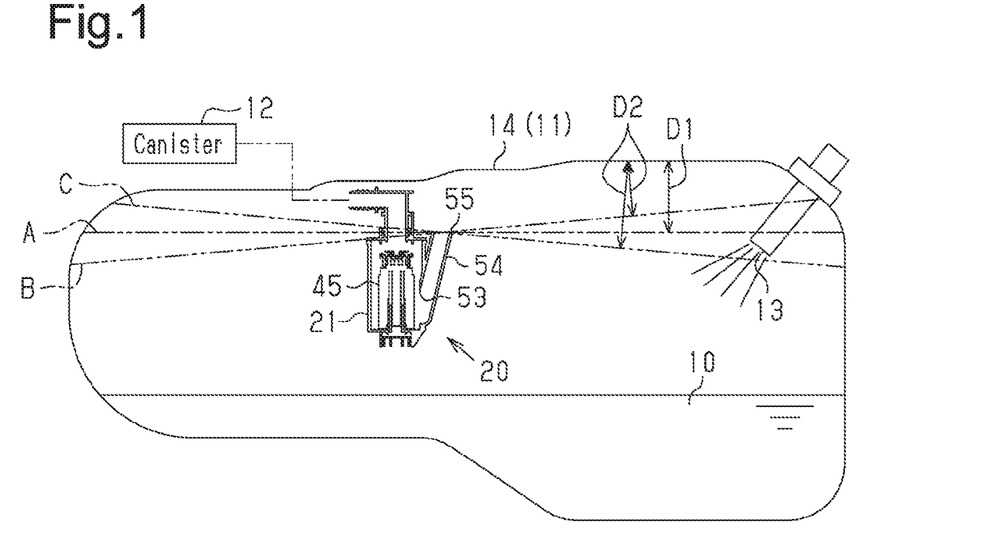
FIG. 1 is a schematic cross-sectional side view of a fuel tank in which a fuel shut-off valve according to a first embodiment is installed.

As shown in FIG. 1, a fuel tank 11 that stores liquid fuel 10 used in an engine (not shown) is installed in the bottom of a vehicle. An evaporative emission control system, which is referred to as an evap circuit, is provided in the vicinity of a fuel tank 11. The evap circuit guides fuel vapor inside the fuel tank 11 to a canister 12 outside the fuel tank 11 and temporarily stores the fuel vapor by adsorbing it on activated carbon and the like, thereby limiting an increase in the internal pressure of the fuel tank 11 due to an increase in the vapor pressure. The canister 12 is connected to the intake passage of the engine. The canister 12 releases the fuel vapor from the activated carbon using the intake negative pressure of the engine and mixes it into the air-fuel mixture, thereby allowing the adsorbed fuel vapor to be used as fuel.

A supply port 13 for the liquid fuel 10 is provided in the wall of the fuel tank 11, and the liquid fuel 10 is supplied to the inside of the fuel tank 11 through the supply port 13.

The fuel shut-off valve 20 is accommodated in the fuel tank 11 in a state in which an inflow port 55, which will be discussed below, is located in a central portion in a plan view of the fuel tank 11. The reason why the fuel shut-off valve 20 is installed in the fuel tank 11 in this manner will be described below. The fuel shut-off valve 20 is attached to the ceiling wall 14 of the fuel tank 11.

The fuel shut-off valve 20 is a full tank detection valve for detecting that the fuel tank has become full during refueling. In addition, the fuel shut-off valve 20 is a fuel cut-off valve for restricting the liquid fuel 10 from flowing into the evap circuit, for example, during traveling of the vehicle.

Figure 2:
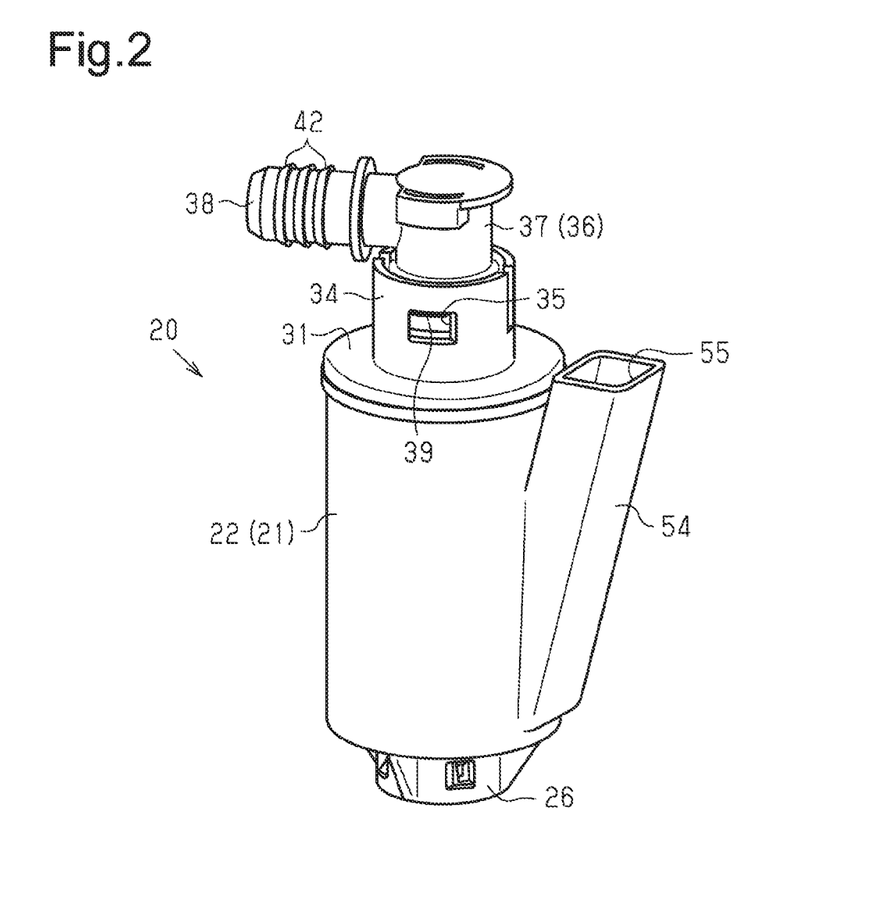
FIG. 2 is a perspective view of the fuel shut-off valve according to the first embodiment.
Figure 3:
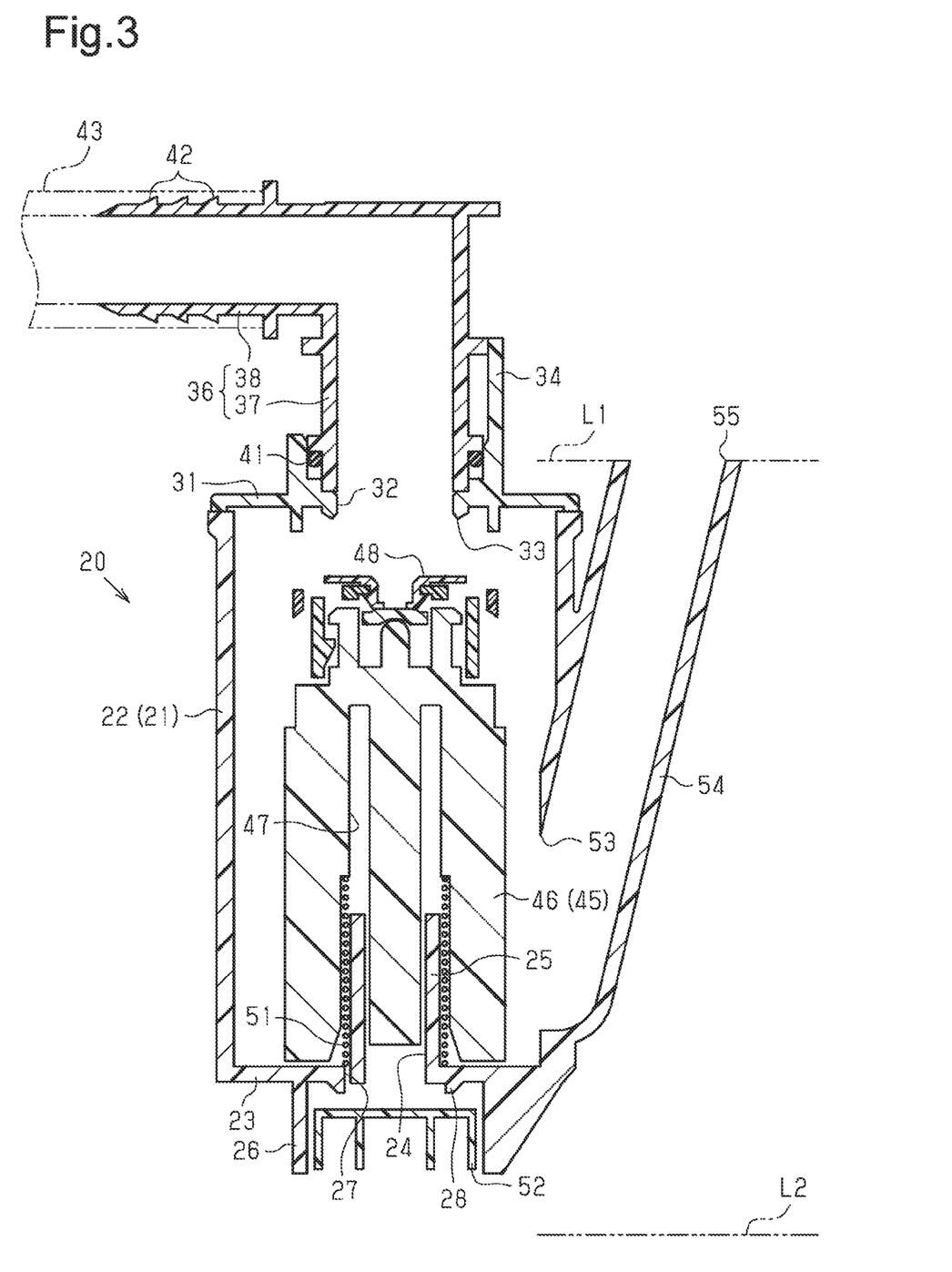
FIG. 3 is a cross-sectional side view of the fuel shut-off valve according to the first embodiment.

As shown in FIGS. 2 and 3, the fuel shut-off valve 20 includes a housing 21, a first float valve 45, a spring 51, a second float valve 52, and a fuel inflow portion 54. Next, each component will be described.

<Housing 21>

The housing 21 includes a tubular portion 22, a lid 31, and a connecting portion 36. The above-mentioned components of the housing 21 may be made of a plastic material.

The tubular portion 22 has a cylindrical shape that extends in the vertical direction. The upper end of the tubular portion 22 is open. The tubular portion 22 has a bottom wall 23 at its lower end. The bottom wall 23 has a communicating hole 24 that connects the inside of the tubular portion 22 and the space below the bottom wall 23 to each other.

A guide wall 25 projects upward from a part of the bottom wall 23 around the communicating hole 24. The guide wall 25 has a tubular shape with open upper and lower ends.

An accommodating wall 26 projects downward from a part of the bottom wall 23 around the guide wall 25. The accommodating wall 26 has a tubular shape with an open lower end.

A through-hole 27 is formed in a part of the bottom wall 23 around the communicating hole 24. The through-hole 27 extends through the bottom wall 23 in the vertical direction.

The space surrounded by the accommodating wall 26 is connected to the inner space of the tubular portion 22 via the space surrounded by the guide wall 25 and the through-hole 27.

The communicating hole 24 and the through-hole 27 constitute a discharge port for discharging the liquid fuel 10 in the housing 21.

A valve seat 28 is formed in a part of the lower surface of the bottom wall 23 that surrounds the communicating hole 24 and the through-hole 27.

The lid 31 closes the upper opening of the tubular portion 22. A communicating opening 32 communicating with the canister 12 is formed in the central portion of the lid 31. A valve seat 33 is formed in a part of the lower surface of the lid 31 that surrounds the communicating opening 32.

A tubular wall 34, which projects upward, is formed in a part of the upper surface of the lid 31 that surrounds the communicating opening 32. The tubular wall 34 has an opening 35, which extends through the tubular wall 34 in the radial direction as shown in FIG. 2.

As shown in FIGS. 2 and 3, the connecting portion 36 has an attaching portion 37 and a nipple 38. The attaching portion 37 has a cylindrical shape that extends in the vertical direction with a closed upper end. The attaching portion 37 has a locking projection 39 on the outer circumferential surface. An O-ring 41 is attached to the outer periphery of the lower end of the attaching portion 37. The attaching portion 37 is inserted into the tubular wall 34 from above and the locking projection 39 is engaged with the opening 35, so that the attaching portion 37 is attached to the tubular wall 34. In this state, the O-ring 41 is arranged between the attaching portion 37 and the tubular wall 34. The O-ring 41 ensures the airtightness between the attaching portion 37 and the tubular wall 34.

The nipple 38 extends outward in the radial direction from the upper end of the attaching portion 37. The nipple 38 has a cylindrical shape with both ends open. The nipple 38 has annular protrusions 42 on the outer circumference. The protrusions 42 are located at positions spaced apart from each other in the longitudinal direction of the nipple 38.

The canister 12 and the fuel shut-off valve 20 are connected to each other by a tube 43. One end of the tube 43 is attached to the canister 12, and the other end is fitted over the nipple 38.

In addition, as shown in FIG. 3, an inlet 53 for the liquid fuel 10 is formed in a part of the tubular portion 22 below the communicating opening 32. In the first embodiment, the inlet 53 is located in the lower part of the tubular portion 22.

<First Float Valve 45>

The first float valve 45 includes a float 46 and a valve seat 48. The float 46 is housed in the tubular portion 22 so as to be movable vertically. More specifically, the float 46 has an annular recess 47, which opens on the lower surface of the float 46 and extends upward. The guide wall 25 is inserted into the annular recess 47 from below the float 46. The guide wall 25 guides vertical movement of the float 46 by allowing vertical movement of the float 46 while restricting movement in other directions.

The valve seat 48 is attached to the upper end of the float 46 at a position below the valve seat 33. The valve seat 48 may be constituted by a part of the float 46. The first float valve 45 is configured to move vertically to close or open the communicating opening 32. Specifically, the first float valve 45 is configured to close the communicating opening 32 when the float 46 moves upward as the level of the liquid fuel 10 rises and the valve seat 48 abuts the valve seat 33 from below. Also, the first float valve 45 is configured to open the communicating opening 32 when the float 46 moves downward as the level of the liquid fuel 10 drops and the valve seat 48 separates downward from the valve seat 33.

<Spring 51>

The spring 51 is constituted by a coil spring and is arranged inside the annular recess 47 in a state surrounding the guide wall 25. This arrangement is made with the spring 51 being compressed between the float 46 and the bottom wall 23 so that the urging force is accumulated.

<Second Float Valve 52>

The second float valve 52 is arranged in the space surrounded by the accommodating wall 26 to be vertically movable. The upper surface of the second float valve 52 is constituted by a flat surface and is a valve seat. The second float valve 52 is configured to move vertically to close or open the communicating hole 24 and the through hole 27, which form the discharge port. Specifically, the second float valve 52 is configured to close the communicating hole 24 and the through-hole 27 when the second float valve 52 moves upward as the level of the liquid fuel 10 rises and abuts the valve seat 28 from below. Also, the second float valve 52 is configured to open the communicating hole 24 and the through-hole 27 when the second float valve 52 moves downward as the level of the liquid fuel 10 drops and separates downward from the valve seat 28.

<Fuel Inflow Portion 54>

As shown in FIGS. 2 and 3, the fuel inflow portion 54 has a shape of a rectangular tube and is provided outside the tubular portion 22. The fuel inflow portion 54 has a first end having the inflow port 55 for the liquid fuel 10 and a second end connected to the inlet 53. The fuel inflow portion 54 guides the liquid fuel 10 flowing in through the inflow port 55 to the inlet 53.

The inflow port 55 is opened at a position above the inlet 53 and spaced outward in the radial direction from the tubular portion 22. In the first embodiment, the inflow port 55 is positioned slightly higher than the communicating opening 32. Assuming that the height of the surface of the liquid fuel 10 when the fuel tank 11 is full is the level L1, the height of the inflow port 55 is set to be the same height as the level L1.

Next, an operation and advantages of the first embodiment configured as described above will be described.

In a normal state in which the surface of the liquid fuel 10 is not significantly disturbed due to sloshing, when the surface of the liquid fuel 10 is located at, for example, a level L2 below the lower end of the fuel shut-off valve 20, the second float valve 52 separates downward from the valve seat 28 by its own weight, and the communicating hole 24 and the through-hole 27 are both open. If the liquid fuel 10 remains in the tubular portion 22, the liquid fuel 10 is discharged to the outside of the housing 21 from the communicating hole 24 and the through-hole 27. At this time, the weight of the first float valve 45 overcomes the urging force of the spring 51, so that the valve seat 48 is located below the valve seat 33, and the communicating opening 32 is opened.

Thus, the fuel vapor inside the fuel tank 11 enters the tubular portion 22 mostly through the inflow port 55, the inner space of the fuel inflow portion 54, and the inlet 53. This fuel vapor rises inside the tubular portion 22 and flows through the communicating opening 32, the connecting portion 36, and the tube 43 to be guided to the canister 12. The inflow of the fuel vapor into the canister 12 limits increase in the pressure of fuel vapor inside the fuel tank 11.

In contrast, when the vehicle travels on a road with irregularities or through a curve, the vehicle swings, which may cause the surface of the liquid fuel 10 to be disturbed due to sloshing. The liquid fuel 10 enters the fuel shut-off valve 20 to be prevented from flowing into the canister 12. That is, the first float valve 45, which is buoyant on the liquid fuel 10, moves upward as the level of the liquid fuel 10 rises, which causes the valve seat 48 to close the communicating opening 32. Also, the urging force of the spring 51 exceeds the weight of the first float valve 45 due to the swinging motion of the vehicle, so that the valve seat 48 closes the communicating opening 32. Accordingly, the fuel shut-off valve 20 is a fuel cut-off valve.

If the level of the liquid fuel 10 inside the fuel tank 11 is lower than the level L1 during refueling using a fueling nozzle, the fuel vapor inside the fuel tank 11 flows into the housing 21 from the inflow port 55 as the level rises, and then flows into the canister 12. Therefore, the refueling is continued with the pressure increase of the fuel vapor inside the fuel tank 11 suppressed.

The second float valve 52, which is also buoyant on the liquid fuel 10, moves upward as the level of the liquid fuel 10 rises, and abuts the valve seat 28. This closes the communicating hole 24 and the through-hole 27, so that the second float valve 52 restricts the liquid fuel 10 from flowing into the inside of the tubular portion 22 through the communicating hole 24 and the through-hole 27.

When the level of liquid fuel 10 rises to the level L1, the liquid fuel 10 flows into the fuel inflow portion 54 from the inflow port 55. The liquid fuel 10 flows into the tubular portion 22 through the inlet 53. This raises the level of the liquid fuel 10 inside the tubular portion 22. At this time, since the liquid fuel 10 flows into the inner space of the fuel inflow portion 54, the inner space of the tubular portion 22, and the like, the fuel vapor inside the fuel tank 11 is shut off from the outside of the fuel tank 11. Accordingly, the pressure of the fuel vapor inside the fuel tank 11 rises to create a differential pressure between the fuel vapor inside the fuel tank 11 and the fuel vapor inside the housing 21, which promotes a rise of the level. Along with the rise of the level, the first float valve 45 rises and the valve seat 48 closes the communicating opening 32, so that ventilation is blocked. This blocking of ventilation instantly increases the pressure of the fuel vapor inside the fuel tank 11, allowing the fuel tank 11 to be detected to be full. This causes automatic stop of the fueling nozzle. That is, the fuel shut-off valve 20 detects that the fuel tank 11 is filled up with the liquid fuel 10 when the pressure of the fuel vapor inside the fuel tank 11 increases after the level of the liquid fuel 10 in the fuel tank 11 reaches the inflow port 55 (level L1) of the fuel inflow portion 54.

As described above, the fuel shut-off valve 20 is accommodated in the fuel tank 11 in a state in which an inflow port 55 is located in a central portion in a plan view of the fuel tank 11. This is due to the following reasons.

When the vehicle is tilted, refueling may be performed with the fuel tank 11 inclined accordingly.

In FIG. 1, line A represents the level when the fuel tank 11 is not tilted. Line B represents the level when the fuel tank 11 is tilted such that the right side is lower than the left side. Line C represents the level when the fuel tank 11 is tilted such that the right side is higher than the left side.

The distance between the ceiling wall 14 and the surface of the liquid fuel 10 when the fuel tank 11 is not tilted is defined as distance D1. Also, the distance between the ceiling wall 14 and the surface of the liquid fuel 10 when the fuel tank 11 is tilted is defined as distance D2. The difference ΔD between the two distances D1 and D2 is the smallest at the central portion of the fuel tank 11 in a plan view. The difference ΔD increases as the distance from the central portion increases.

Therefore, the detection accuracy decreases as the distance between the inflow port 50, which detects a full tank, and the central portion increases, and the detection accuracy increases as the distance decreases. Therefore, the fuel shut-off valve 20 may be arranged such that the inflow port 55 is positioned in the central portion.

However, there may not be a sufficiently large space in the central portion for arranging the entire fuel shut-off valve 20.

In this regard, since the inflow port 112 is adjacent to the housing 101 in the conventional fuel shut-off valve 110 shown in FIG. 15A, the position of the housing 101 is largely restricted by the inflow port 112. In this case, it is difficult to arrange the fuel shut-off valve 110 such that the inflow port 112 is positioned in the central portion in a plan view of the fuel tank. Thus, the fuel shut-off valve 110 is typically arranged at a position off the central portion. Accordingly, the inflow port 112 is also located at a position off the central portion, so that the full tank detection accuracy is reduced.

(1) In contrast, in the first embodiment, the inflow port 55 is located at a position away from and outward in the radial direction of the tubular portion 22 of the housing 21 as shown in FIG. 1. The restriction on the position of the housing 21 caused by the inflow port 55 is less than that in the conventional fuel shut-off valve 110, in which the inflow port 112 is arranged at a position adjacent to the housing 101. Therefore, even if there is no space large enough to arrange the fuel shut-off valve 20 in the central portion in a plan view of the fuel tank 11, the inflow port 55 can be arranged in the central portion, and the housing 21 can be arranged at a position off the central portion.

As described above, the first embodiment increases the flexibility in the installing position of the fuel shut-off valve 20 in relation to the fuel tank 11.

When the liquid surface drops as the liquid fuel 10 is consumed, the second float valve 52 is moved downward away from the valve seat 28. This opens the communicating hole 24 and the through-hole 27. Then, the liquid fuel 10 inside the housing 21 is discharged to the outside of the housing 21 through the communicating hole 24 and the through-hole 27. When the level of the liquid fuel 10 inside the housing 21 drops, the weight of the first float valve 45 overcomes the urging force of the spring 51, and the valve seat 48 moves downward away from the valve seat 33, so that the communicating opening 32 is opened.

In addition to the above described one, the first embodiment has the following advantages.

(2) If the fuel inflow portion 54 is not provided and the inlet 53 is simply formed in the upper part of the tubular portion 22 in order to raise the full-tank level L1, the inlet 53 approaches the communicating opening 32. When the surface of the liquid fuel 10 is disturbed due to sloshing, the liquid fuel 10 flowing in from the inlet 53 may flow into the communicating opening 32 and flow out to the canister 12 outside of the fuel tank 11. However, in the first embodiment, although the full-tank level L1 is set above the tubular portion 22 of the fuel shut-off valve 20, the inlet 53 is provided in the lower portion of the tubular portion 22. The inlet 53 is spaced downward away from the communicating opening 32. Therefore, unlike the case in which the fuel inflow portion 54 is not provided and the inlet 53 is simply formed in the upper part of the tubular portion 22, the liquid fuel 10 flowing into the housing 21 from the inlet 53 is unlikely to directly flow into the canister 12 through the communicating opening 32.

(3) Since the fuel inflow portion 54 is formed integrally with the tubular portion 22, the number of components of the fuel shut-off valve 20 is reduced as compared with a case in which these are formed as separate components.

Also, the fuel inflow portion 54 can be molded together when molding the tubular portion 22. If the fuel inflow portion 54 is constituted by a component separate from the tubular portion 22, a step of assembling the components after molding of each component is required, but such a step is unnecessary in the present embodiment. It is thus possible to produce the fuel shut-off valve 20 with a fewer number of steps.

Second Embodiment

Figure 4:
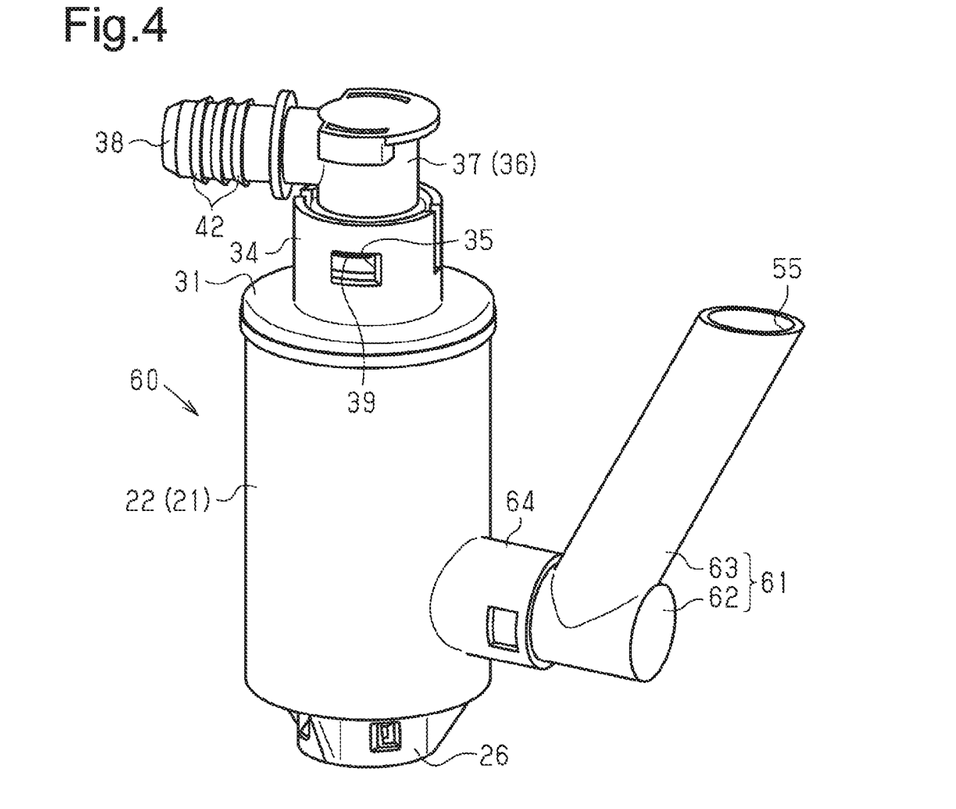
FIG. 4 is a perspective view of a fuel shut-off valve according to a second embodiment.
Figure 5:
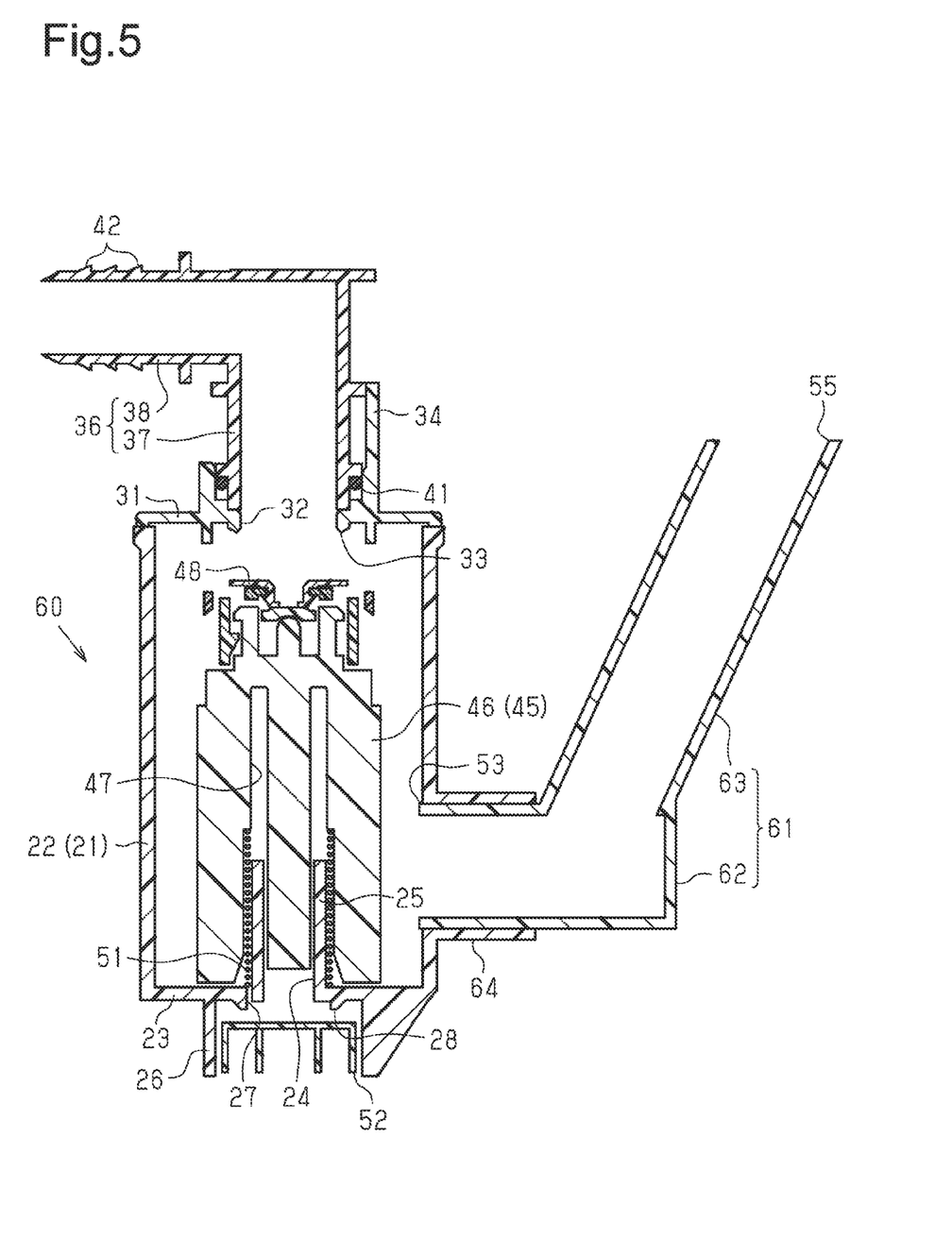
FIG. 5 is a cross-sectional side view of the fuel shut-off valve according to the second embodiment.

A fuel shut-off valve 60 according to a second embodiment will now be described with reference to FIGS. 4 to 5.

In the fuel shut-off valve 60 of the second embodiment, a fuel inflow portion 61 constituted by a component different from the tubular portion 22 is used as a fuel inflow portion. That is, the fuel inflow portion 61 is assembled to the tubular portion 22 in the fuel shut-off valve 60 of the second embodiment. In this respect, the second embodiment is different from the first embodiment, in which the fuel inflow portion 54 is integrally formed with the tubular portion 22.

More specifically, an inlet 53 for the liquid fuel 10 is formed in a lower portion of the tubular portion 22 that is below the communicating opening 32. In the tubular portion 22, a cylindrical attachment portion 64 projects outward in the radial direction of the tubular portion 22 from the periphery of the inlet 53. The attachment portion 64 is integrally formed with the tubular portion 22 as part of the tubular portion 22.

The fuel inflow portion 61 is formed by a cylindrical attaching portion 62 and a cylindrical branch portion 63 and is entirely made of a hard plastic.

One end of the attaching portion 62 is open, and the other end is closed. At least the vicinity of the open end of the attaching portion 62 has an outer diameter slightly smaller than the inner diameter of the attachment portion 64.

The ends of the branch portion 63 are both open. Toward the upper end, the branch portion 63 is tilted away outward in the radial direction of the tubular portion 22. The lower end of the branch portion 63 is connected to the attaching portion 62 in a communicating state. The upper end of the branch portion 63 constitutes the inflow port 55. The inflow port 55 is located at the position farthest away from the tubular portion 22 outward in the radial direction of the branch portion 63.

The fuel inflow portion 61, which has the above-described configuration, is fitted to the attachment portion 64 at the open end of the attaching portion 62, to be assembled to the tubular portion 22. The fitting is performed inside the attachment portion 64 in the second embodiment, but it may be performed outside the attachment portion 64. The fuel inflow portion 61 has a first end having the inflow port 55 and a second end connected to the inlet 53.

The configuration other than the above is similar to the first embodiment. Thus, the same components as those in the first embodiment are given the same reference numerals, and detailed explanations are omitted.

In addition to the advantages of the above described items (1) and (2), the second embodiment has advantages of the following items (4) and (5).

(4) The fuel inflow portion 61 is constituted by a separate part from the tubular portion 22. Therefore, as compared with the one in which the fuel inflow portion and the tubular portion are formed integrally, the shape of each component is simplified, which facilitates molding using molds.

(5) If a plurality of types of fuel inflow portions 61 having different inclination angles, lengths and the like of the branch portion 63, the length of the attaching portion 62, and the like are prepared beforehand, it is possible to change the height of the inflow port 55 and the position of the inflow port 55 in a plan view of the fuel tank 11 by changing the fuel inflow portion 61 attached to the attachment portion 64.

A portion of the fuel shut-off valve 60 different from the fuel inflow portion 61 can be used as a component common to a plurality of types of fuel tanks 11. That is, a fuel inflow portion 61 corresponding to the position of an inflow port 55 different for each type of fuel tank 11 should be selected and attached to the attachment portion 64.

Third Embodiment

Figure 6:
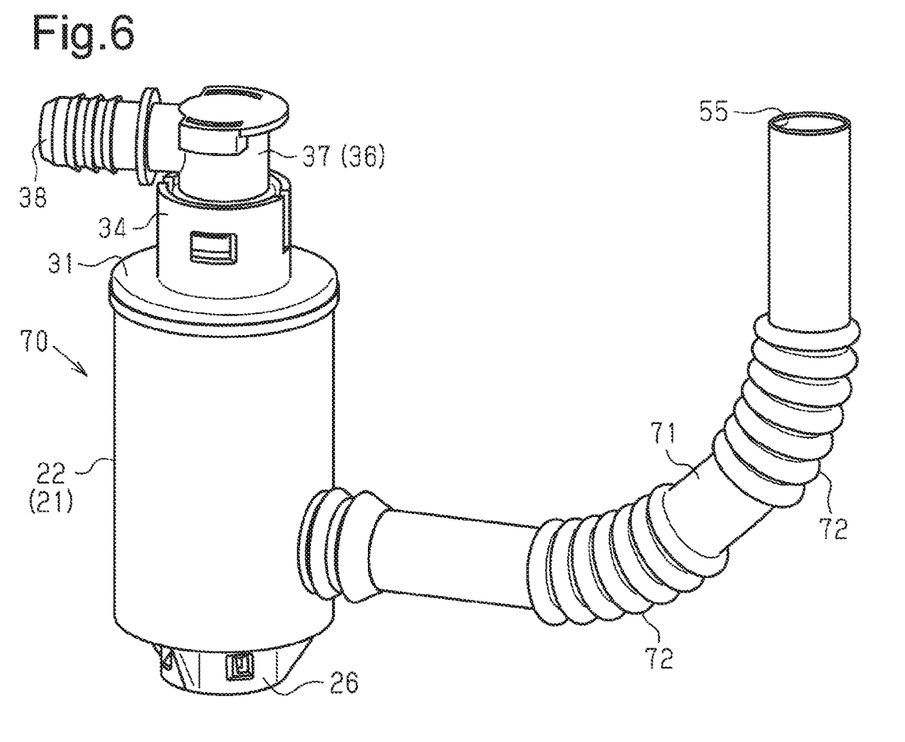
FIG. 6 is a perspective view of a fuel shut-off valve according to a third embodiment.
Figure 7:
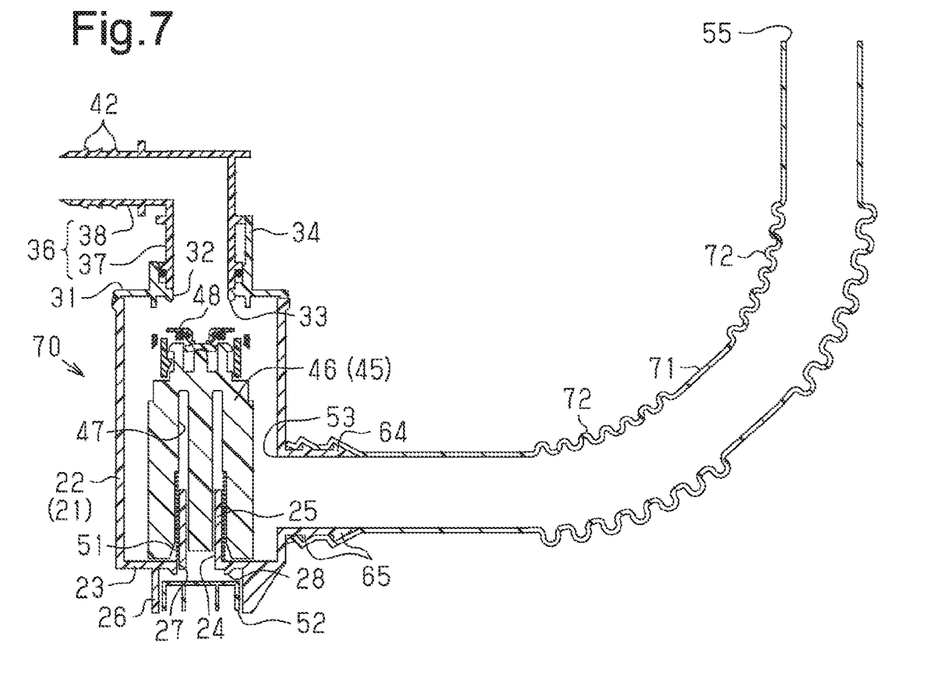
FIG. 7 is a cross-sectional side view of the fuel shut-off valve according to the third embodiment.

A fuel shut-off valve 70 according to a third embodiment will now be described with reference to FIGS. 6 to 7.

The fuel shut-off valve 70 of the third embodiment uses a fuel inflow portion 71 that includes at least one accordion portion 72. The entire fuel inflow portion 71, including the accordion portions 72, is made of a plastic that is softer than that of the fuel inflow portion 61 of the second embodiment. In this respect, the third embodiment is different from the second embodiment in which the entire fuel inflow portion 61 may be made of a hard plastic.

More specifically, the cylindrical attachment portion 64 has the same structure as the above-described nipple 38. That is, the attachment portion 64 has annular protrusions 65 on the outer circumference. The protrusions 65 are located at positions spaced apart from each other in the longitudinal direction of the attachment portion 64.

The fuel inflow portion 71 has a tubular shape with open ends. In the third embodiment, the fuel inflow portion 71 has accordion portions 72 at two intermediate positions in its longitudinal direction. The fuel inflow portion 71 can expand and contract and bend at each accordion portion 72. One of the open ends of the fuel inflow portion 71 is fitted over the annular protrusions 65 of the attachment portion 64. The other open end of the fuel inflow portion 71 constitutes the inflow port 55 for the liquid fuel 10. The fuel inflow portion 71 has a first end having the inflow port 55 and a second end connected to the inlet 53.

The configurations other than the above are the same as the second embodiment. Thus, the same components as those in the second embodiment are given the same reference numerals, and detailed explanations are omitted.

In addition to the advantages of the above described items (1), (2), (4), and (5), the third embodiment has the following advantage. Further, as shown in the following item (1A), the advantage of the above-described item (1) is enhanced.

(1A) The fuel inflow portion 71 can expand and contract and bend at the accordion portions 72 to change the position of the inflow port 55.

The restriction on the position of the housing 21 caused by the inflow port 55 is less than that in the fuel shut-off valves 20 and 60 of the first and second embodiments, in which the position of the inflow port 55 in relation to the housing 21 may be more limited.

Therefore, even if there is no space large enough to arrange the fuel shut-off valve 70 in the central portion in a plan view of the fuel tank 11, the inflow port 55 can be arranged in the central portion, and the housing 21 can be arranged at a position significantly far away from the central portion.

In particular, in the third embodiment, since the accordion portions 72 are provided at two positions, the degrees of expansion and contraction and bending are greater than those in the case in which it is provided at one position. This adds to the flexibility in the setting of the position of the inflow port 55.

As described above, the third embodiment further increases the flexibility in the installing position of the fuel shut-off valve 70 in relation to the fuel tank 11.

Fourth Embodiment

Figure 8A:
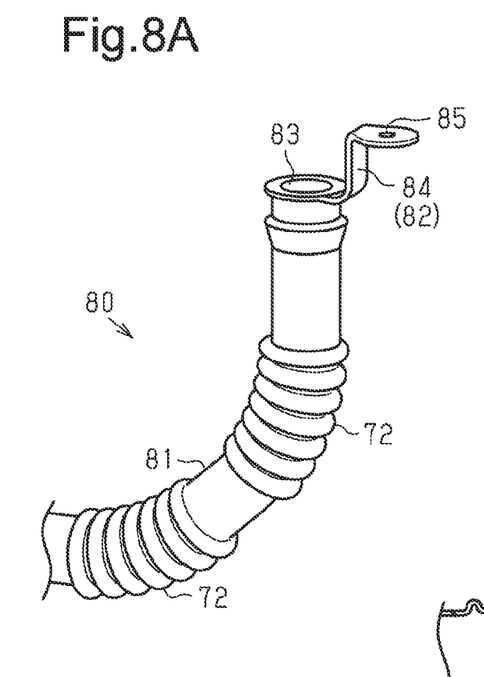
FIG. 8A is a partial perspective view of a fuel inflow portion of a fuel shut-off valve according to a fourth embodiment.
Figure 8B:
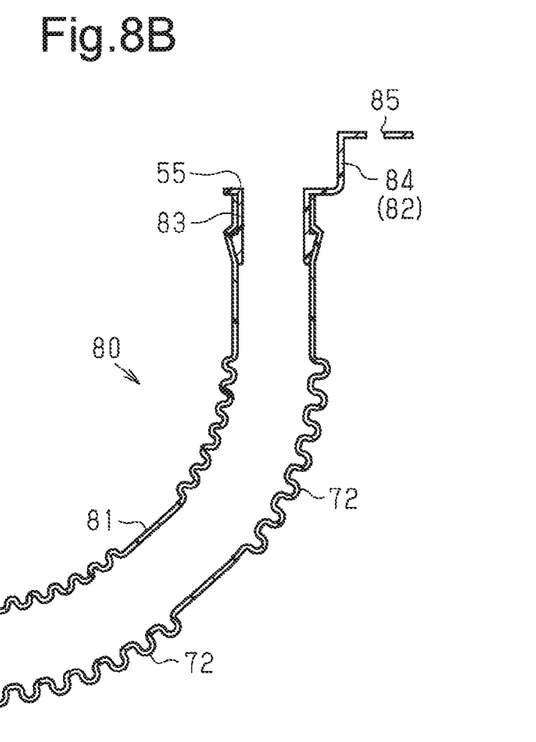
FIG. 8B is a partial cross-sectional side view of the fuel inflow portion of FIG. 8A.

A fuel shut-off valve 80 according to a fourth embodiment will now be described with reference to FIGS. 8A, 8B, and 9.

Although not described in the above first to third embodiments, the fuel tank 11 may incorporate fuel system components such as a fuel pump 15 for delivering the liquid fuel 10 to the engine and surface-disturbance suppressing components (not shown) for suppressing disturbance of the surface of the liquid fuel 10.

The fuel shut-off valve 80 of the fourth embodiment uses a fuel inflow portion 81 that includes an engaging portion 82. In this respect, the fourth embodiment is different from the fuel shut-off valve 70 of the third embodiment, in which the fuel inflow portion 71 has no engaging portion 82.

More specifically, the engaging portion 82 includes a cylindrical insertion portion 83 having upper and lower open ends and a thin attachment plate 84. The attachment plate 84 is bent in the thickness direction at several sections. The attachment plate 84 is connected to the upper end of the insertion portion 83 at one end. The attachment plate 84 has an engagement hole 85 at the other end. The engagement hole 85 extends through the attachment plate 84.

The insertion portion 83 is attached to the inflow port 55 by being inserted into the fuel inflow portion 81 from the inflow port 55.

The upper part of the fuel pump 15 as a fuel system component is located at the upper part inside the fuel tank 11. The fuel pump 15 has an engagement portion 16 having a protrusion 17 at its upper part inside the fuel tank 11.

The engaging portion 82 is engaged with the engagement portion 16 by engaging the engaging portion 82 with the protrusion 17 at the engagement hole 85.

Engagement of the engaging portion 82 with the engagement portion 16 may be performed after or before installing the fuel pump 15 on the fuel tank 11. In the latter case, the fuel pump 15 is installed inside the fuel tank 11 with the engaging portion 82 engaged with the engagement portion 16.

The configurations other than the above are the same as the third embodiment. Thus, the same components as those in the third embodiment are given the same reference numerals, and detailed explanations are omitted.

In addition to the advantages of the above described items (1), (2), (4), (5), and (1A), the fourth embodiment has the advantage of the following item (6).

(6) The engaging portion 82 of the fuel inflow portion 81 is engaged with the engagement portion 16 of the fuel pump 15. Therefore, although the fuel inflow portion 81 is flexible, it is possible to position the inflow port 55 at a predetermined position and hold it at that position.

In particular, the engaging portion 82 is provided in the inflow port 55, and the fuel inflow portion 81 is engaged with the engagement portion 16 near the inflow port 55. Therefore, the position of the inflow port 55 is stabilized as compared with a case in which the engaging portion 82 is provided at a position spaced away from the inflow port 55.

The above-described embodiments may be modified as follows.

<Regarding Communicating Hole 24 and Through-Hole 27>

The communicating hole 24 and the through-hole 27, which form a discharge port for the liquid fuel 10, may be provided at a position above the bottom wall 23 of the tubular portion 22.

<Regarding Second Float Valve 52>

The second float valve 52 can be omitted by sufficiently reducing the opening area of the communicating hole 24 and the through-hole 27, which form a discharge port, with respect to the opening area of the inlet 53.

In this case, the liquid fuel 10 outside the housing 21 can flow into the housing 21 through the communicating hole 24 and the through-hole 27 in addition to the inlet 53. However, since the amount of the liquid fuel 10 flowing into the housing 21 through the communicating hole 24 and the through-hole 27 is sufficiently smaller than the amount of the liquid fuel 10 flowing into the housing 21 through the inlet 53, the influence on the full tank detection is negligible.

Further, when the liquid fuel 10 in the fuel tank 11 is consumed and the level drops, the liquid fuel 10 inside the housing 21 can be discharged in small amounts from the communicating hole 24 and the through-hole 27.

<Regarding Fuel Inflow Portions 71, 81>

The number of the accordion portions 72 in the fuel inflow portions 71, 81 may be changed to one or more than two. Also, the length of each accordion portion 72 may be changed.

The fuel inflow portion 81 in the fourth embodiment may be constituted by a plastic tube having flexibility characteristics. In this case, the fuel inflow portion 81 may be configured with or without accordion portions 72. This is because the fuel inflow portion 81 has flexibility characteristics and is bendable.

In the fourth embodiment, the engaging portion 82 may be provided at a position spaced away from the inflow port 55 in the fuel inflow portion 81 in the longitudinal direction.

The engaging portion 82 in the fourth embodiment may be engaged with a fuel system component different from the fuel pump 15 inside the fuel tank 11, for example, a fuel surface-disturbing suppressing component (not shown).

In the fourth embodiment, the upper end of the fuel inflow portion 81 may be attached to a fuel system component inside the fuel tank 11 by a fastening method such as screw fastening without using the engaging portion 82.

In the third and fourth embodiments, the upper end of the fuel inflow portion 71, 81 may be fixed to the inner wall of the fuel tank 11, for example, the ceiling wall 14, by fixing means such as welding.

<Regarding Entire Fuel Shut-Off Valves 20, 20A, 60, 60A, 70, 80, 80A>

Figure 10:
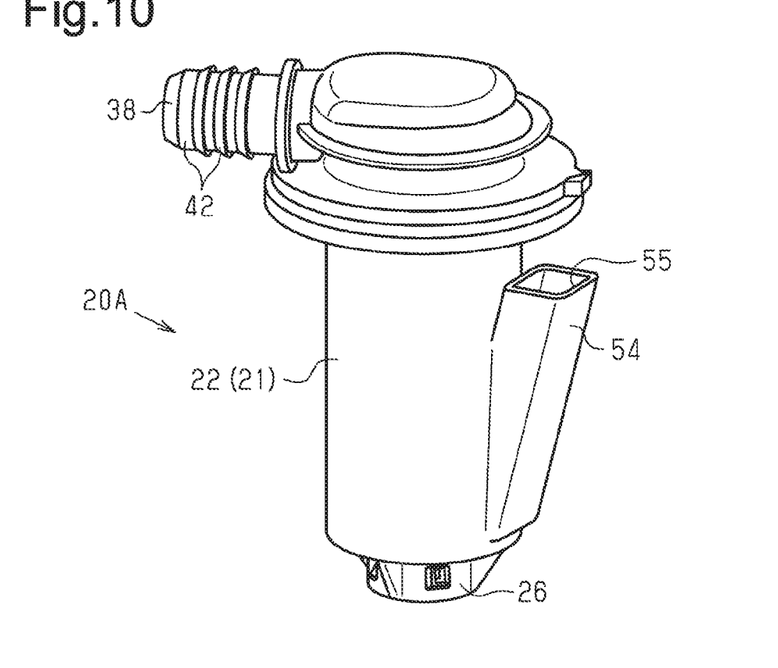
FIG. 10 is a perspective view of a fuel shut-off valve according to a modification of the first embodiment.
Figure 11:
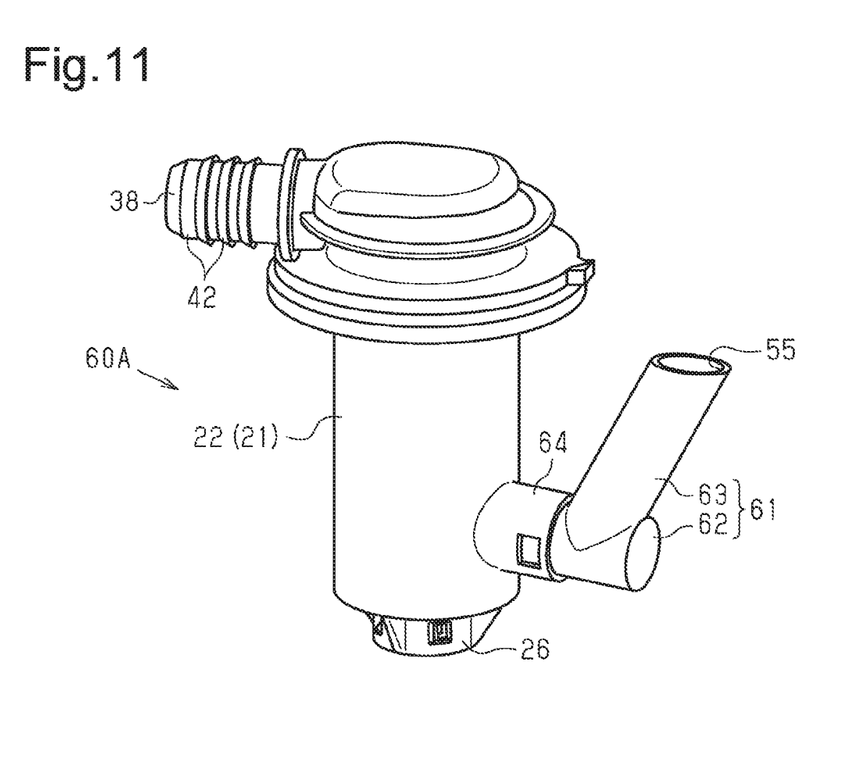
FIG. 11 is a perspective view of a fuel shut-off valve according to a modification of the second embodiment.
Figure 12:
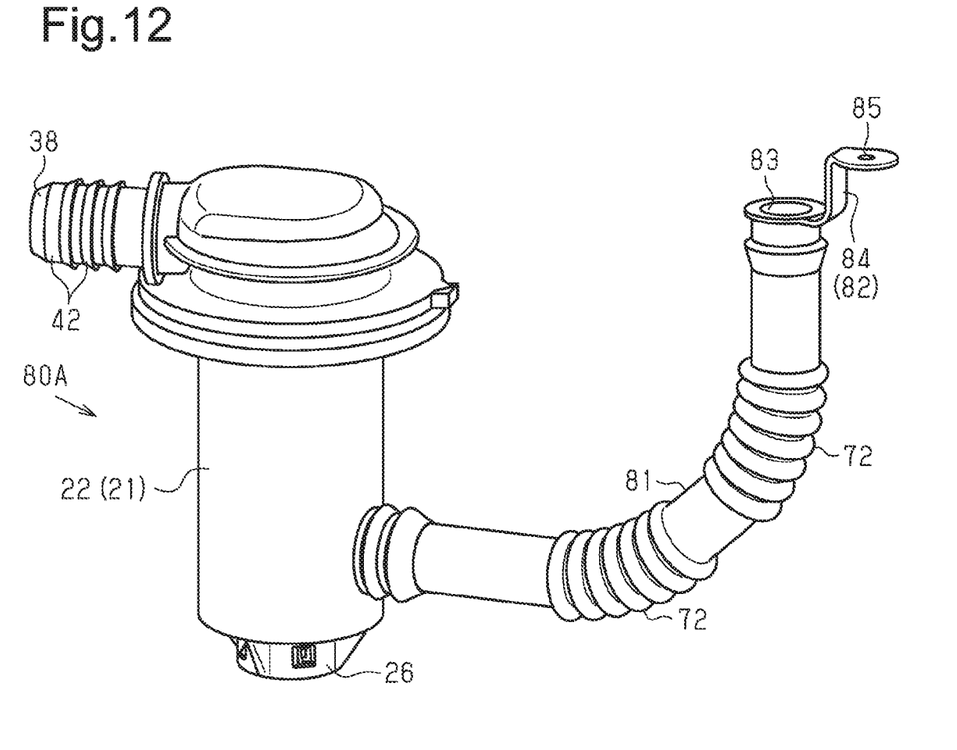
FIG. 12 is a perspective view of a fuel shut-off valve according to a modification of the fourth embodiment.

The fuel shut-off valve may be changed to one in which the shape of the upper part of the housing 21 is different from those in the first to fourth embodiment. FIG. 10 shows a fuel shut-off valve 20A according to a modification corresponding to the fuel shut-off valve 20 of the first embodiment (FIG. 2). FIG. 11 shows a fuel shut-off valve 60A according to a modification corresponding to the fuel shut-off valve 60 of the second embodiment (FIG. 4). FIG. 12 shows a fuel shut-off valve 80A according to a modification corresponding to the fuel shut-off valve 80 of the fourth embodiment (FIG. 8A). However, the shape of the fuel shut-off valve is not limited thereto and other shapes could also be used based on design requirements.

Although the shape of the upper part of the housing 21 is different, each of the fuel shut-off valves 20A, 60A, and 80A of the modifications has the same internal structure as the fuel shut-off valves 20, 60, 70, and 80 of the first to fourth embodiments. Accordingly, the same advantages are achieved.

<Regarding Case of Fuel Shut-Off Valve Installed in Saddle-Shaped Fuel Tank 90>

Figure 13:
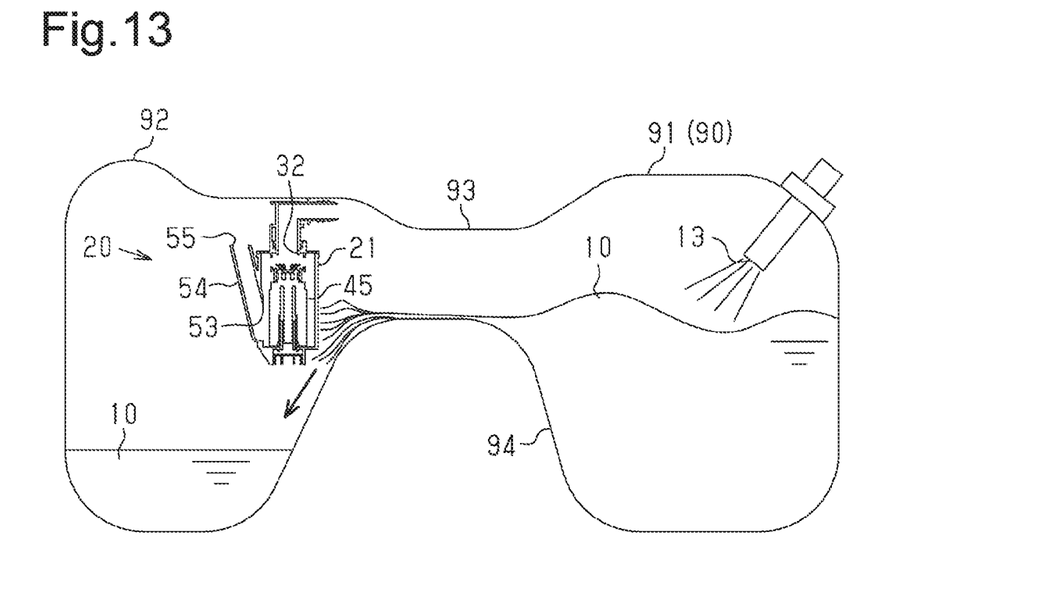
FIG. 13 is a schematic cross-sectional side view showing a state in which a fuel tank is installed in a saddle-shaped fuel tank in a manner different from the first embodiment.

The above-described fuel shut-off valves 20, 20A, 60, 60A, 70, 80, and 80A may be installed in the manner shown in FIG. 13 when installed in a saddle-shaped fuel tank. Although the fuel shut-off valve 20 will be described as an example, the same applies to the other fuel shut-off valves 20A, 60, 60A, 70, 80, and 80A.

As shown in FIG. 13, a saddle-shaped fuel tank 90 has fuel containing portions 91 and 92 arranged in a state of being separated from each other and a coupling portion 93 that couples the fuel containing portions 91 and 92 to each other. In the fuel tank 90, a part that is between the fuel containing portions 91 and 92 and below the coupling portion 93 constitutes a saddle portion 94. The driveshaft or the exhaust pipe of the vehicle (neither is shown) may be arranged in the saddle portion 94.

In this type of fuel tank 90, since the supply port 13 is provided in one of the fuel containing portions 91, 92, the fuel containing portion 91 on the right in FIG. 13, the levels of the liquid fuel 10 may be different between the fuel containing portions 91 and 92. This is because the liquid fuel 10 is initially supplied to the fuel containing portion 91 provided with the supply port 13 and thereafter fed to the fuel containing portions 92 on the opposite side over the saddle portion 94.

Although not illustrated, if the fuel shut-off valve 20 may be installed such that the inflow port 55 is located between the housing 21 and the saddle portion 94 in the fuel containing portion 92, the following problem may occur. When the liquid fuel 10 overflows the fuel containing portion 91 and attempts to flow into the fuel containing portion 92 over the saddle portion 94, the liquid fuel 10 may flow into the fuel inflow portion 54 from the inflow port 55. In this case, even if the level of the liquid fuel 10 in the fuel containing portion 92 is lower than the full-tank level L1, the fuel shut-off valve 20 may erroneously detect that the fuel tank is full and the first float valve 45 may close the communicating opening 32.

Therefore, as shown in FIG. 13, the fuel shut-off valve 20 may be arranged in the fuel containing portion 92 such that the inflow port 55 is located on the opposite side of the housing 21 from the saddle portion 94. In this configuration, it is unlikely that the liquid fuel 10 that has flowed over the saddle portion 94 will flow into the fuel inflow portion 54. This allows the full-tank level L1 to be accurately detected.

In the conventional fuel shut-off valve 110 shown in FIG. 15A, in which the inflow port 112 is provided around the entire circumference of the housing 101, the fuel shut-off valve 110 is normally installed at a position away from the saddle portion 94 in order to prevent the liquid fuel 10 that has flowed over the saddle portion 94 from flowing into the fuel inflow portion 111 from the inflow port 112. In this case, the inflow port 112 is positioned away from the central portion in a plan view of the fuel tank 90, which reduces the full tank detection accuracy when the fuel tank 90 is tilted.

<Regarding Manner of Installing Fuel Shut-Off Valves 20, 20A, 60, 60A, 70, 80, and 80A in Fuel Tank 11>

The fuel shut-off valve 20 may be attached to the ceiling wall 14 of the fuel tank 11 while being entirely accommodated in the fuel tank 11 as in the first embodiment.

This applies not only to the fuel shut-off valve 20, but also to the other fuel shut-off valves 20A, 60, 60A, 70, 80 and 80A and the case of the saddle-shaped fuel tank 90.

Figure 9:
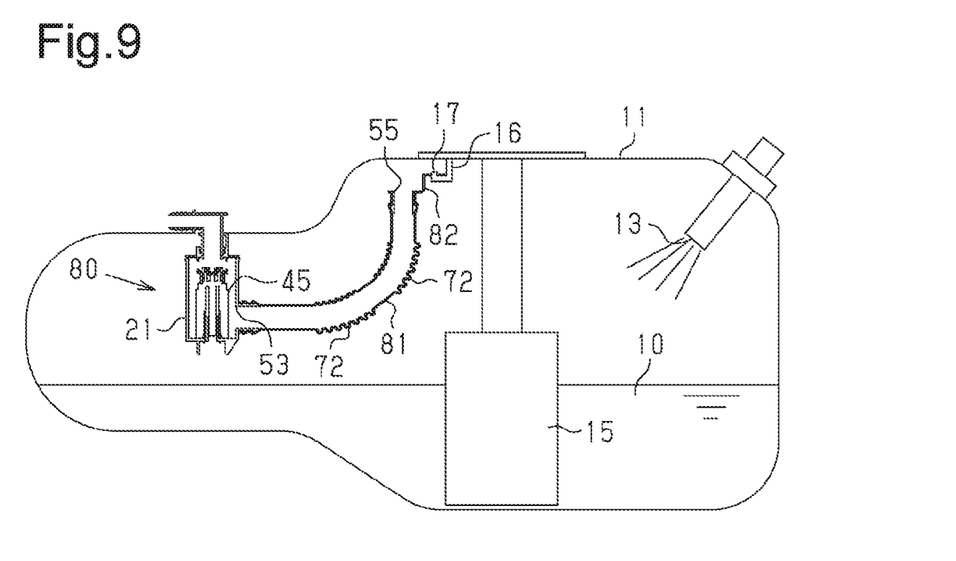
FIG. 9 is a schematic cross-sectional side view of a fuel tank in which the fuel shut-off valve according to the fourth embodiment is installed.

The fuel shut-off valve 80 may be fixed to the ceiling wall 14 by means such as welding in a state of being inserted through the ceiling wall 14 as shown in FIG. 9. In this case, the upper part of the fuel shut-off valve 80 is exposed to the outside of the fuel tank 11.

This applies not only to the fuel shut-off valve 80, but also to the other fuel shut-off valves 20, 20A, 60, 60A, 70, and 80A and the case of the saddle-shaped fuel tank 90.

The invention claimed is:

1. A fuel shut-off valve configured to shut off a flow of fuel vapor to an outside of a fuel tank, the fuel shut-off valve comprising:
    a housing including
        a communicating opening provided in an upper part of the housing and communicates with the outside of the fuel tank,
        a tubular portion extending in a vertical direction, and
        an inlet for liquid fuel provided inside the fuel tank, the inlet being located in the tubular portion at a position below the communicating opening;
    a float valve housed in the tubular portion and configured to move vertically, the float valve selectively closing and opening the communicating opening by the vertical movement, wherein the fuel shut-off valve is configured such that, as a level of liquid fuel that has flowed into the tubular portion through the inlet rises, the float valve moves upward and closes the communicating opening to shut off the flow of fuel vapor to the outside of the fuel tank; and
    a tubular fuel inflow portion provided outside the tubular portion and having a first end having an inflow port for liquid fuel and a second end connected to the inlet, the fuel inflow portion guiding liquid fuel that has flowed in from the inflow port to the inlet, wherein
    the inflow port is opened at a position that is above the inlet and spaced outward in a radial direction from the tubular portion,
    the housing includes a discharge port configured to discharge liquid fuel in the housing, and
    wherein the inflow port is positioned above the communicating opening.

2. The fuel shut-off valve according to claim 1, wherein the fuel inflow portion is formed integrally with the tubular portion.

3. The fuel shut-off valve according to claim 1, wherein the fuel inflow portion is constituted by a component different from the tubular portion and is assembled to the tubular portion.

4. The fuel shut-off valve according to claim 3, wherein the fuel inflow portion is made of a plastic softer than the tubular portion and having flexibility characteristics.

5. The fuel shut-off valve according to claim 4, wherein a part of the fuel inflow portion in a longitudinal direction includes an accordion portion.

6. The fuel shut-off valve according to claim 5, wherein a fuel system component is arranged inside the fuel tank, and
the fuel inflow portion includes an engaging portion that is engaged with an engagement portion provided in the fuel system component.

7. The fuel shut-off valve according to claim 6, wherein the engaging portion is attached to the inflow port of the fuel inflow portion.

8. The fuel shut-off valve according to claim 6, wherein the fuel system component is a fuel pump configured to deliver liquid fuel in the fuel tank to the outside of the fuel tank.

9. The fuel shut-off valve according to claim 1, wherein the float valve is a first float valve,
the fuel shut-off valve further comprises a second float valve,
as the level of liquid fuel outside the housing rises, the second float valve moves upward to close the discharge port, and
as the level of the liquid fuel drops, the second float valve moves downward to open the discharge port.

10. The fuel shut-off valve according to claim 1, wherein the inflow port is located in a central portion in a plan view of the fuel tank.

* * * * *